(12) United States Patent
Scheibe (10) Patent No.: US 10,158,193 B2
(45) Date of Patent: Dec. 18, 2018

(54) SENSOR ARRANGEMENT AND CONNECTION ELEMENT FOR USE IN PROCESS AUTOMATION

(71) Applicant: Endress + Hauser Conducta GmbH + Co. KG, Gerlingen (DE)

(72) Inventor: Sven-Matthias Scheibe, Reichenberg (DE)

(73) Assignee: Endress + Hauser Conducta GmbH + Co. KG, Gerlingen (DE)

( * ) Notice: Subject to any disclaimer, the term of this patent is extended or adjusted under 35 U.S.C. 154(b) by 0 days.

(21) Appl. No.: 15/818,960

(22) Filed: Nov. 21, 2017

(65) Prior Publication Data
US 2018/0159268 A1 Jun. 7, 2018

(30) Foreign Application Priority Data
Nov. 28, 2016 (DE) .................. 10 2016 122 890

(51) Int. Cl.
*G01H 11/00* (2006.01)
*H01R 13/625* (2006.01)
(Continued)

(52) U.S. Cl.
CPC .......... *H01R 13/625* (2013.01); *G01D 11/30* (2013.01); *H01R 13/6277* (2013.01);
(Continued)

(58) Field of Classification Search
CPC .... G01H 1/00; G01N 3/04; G01N 2203/0017; G01N 2203/0405; G01N 3/08; G01N 2203/0447
(Continued)

(56) References Cited

U.S. PATENT DOCUMENTS

| 6,663,396 | B1 | 12/2003 | Wang |
| 8,272,271 | B2 * | 9/2012 | Buschnakowski ....... G01H 3/00 73/649 |
| 2010/0124837 | A1 | 5/2010 | Gimenes et al. |

FOREIGN PATENT DOCUMENTS

| DE | 69716176 T2 | 8/2003 |
| EP | 1625643 A1 | 2/2006 |
| WO | 2004102748 A1 | 11/2004 |

OTHER PUBLICATIONS

Search Report for German Patent Application No. 10 2016 122 890.7, German Patent Office, dated Jun. 20, 2017, 7 pp.

* cited by examiner

*Primary Examiner* — Phuong Chi T Nguyen
(74) *Attorney, Agent, or Firm* — Kelly J. Smith; PatServe

(57) ABSTRACT

A sensor arrangement for use in process automation, including a sensor with at least one sensor element for detecting a measurand of process automation, a first interface for transmitting a value that is a function of the measurand to a second interface, and a first coupling body having the first interface, the sensor further including a connection element for transmitting the value to a higher-level unit, the connection element including a first housing section with a second interface complementary to the first interface, wherein the first and second interfaces are designed for bi-directional communication between the sensor and the higher-level unit and to ensure the power supply to the sensor, a second housing section with a second coupling body complementary to the first coupling body and having an open and a locked condition, wherein the first housing section can be rotated in relation to the second housing section.

16 Claims, 7 Drawing Sheets

(51) Int. Cl.
  *H01R 13/6584* (2011.01)
  *H01R 13/627* (2006.01)
  *G01D 11/30* (2006.01)
  H01R 101/00 (2006.01)
  H01R 13/639 (2006.01)
  H01R 35/04 (2006.01)
  H01F 38/14 (2006.01)
(52) U.S. Cl.
  CPC ......... *H01R 13/6584* (2013.01); *H01F 38/14* (2013.01); *H01R 13/639* (2013.01); *H01R 35/04* (2013.01); *H01R 2101/00* (2013.01); *H01R 2201/20* (2013.01)
(58) Field of Classification Search
  USPC ....... 43/649, 861.08, 861.18, 861.34, 862.59
  See application file for complete search history.

SENSOR ARRANGEMENT AND CONNECTION ELEMENT FOR USE IN PROCESS AUTOMATION

CROSS-REFERENCE TO RELATED APPLICATION

The present application is related to and claims the priority benefit of German Patent Application No. 10 2016 122 890.7, filed on Nov. 28, 2016, the entire contents of which are incorporated herein by reference.

TECHNICAL FIELD

The present disclosure relates to a sensor arrangement and a connection element for use in process automation for transmitting a value that is a function of a measurand from a sensor to a higher-level unit.

BACKGROUND

In process automation, sensors are connected to a connection element by means of a mechanical coupling often by means of a bayonet joint. The connection element comprises a cable attachment and a cable. The cable, in turn, is connected to a higher-level unit, such as a measuring transducer or a control center. On the sensor and on the connection element is respectively located an interface which is, for example, designed to be inductive or optical, and via which the sensor is supplied with energy and a communication from the server to the connection element or the higher-level unit is ensured. Such an arrangement is described, for example, in EP 1 625 643.

In this respect, reference is made, in particular, to the products, "Memosens," of the applicant. Other generic designs are, for example, "Memosens" of the company Knick, "ISM" of the company Mettler-Toledo, or the "ARC" system of the company Hamilton.

The currently used sensors and connection elements are in these cases connected axially, and appropriately locked, as mentioned, with, for example, a bayonet joint. Such a bayonet joint is described in WO 2004/102748, for example. In the connected condition, the housings of the sensor and of the connection element are in an axial arrangement in relation to one another. The sensor-side sensor element, e.g., an element for determining a pH value, as well as the cable-side connecting piece to the higher-level unit, are also located in an axial direction to the respective interfaces. This results in a rigid arrangement that has a length of approximately 25 to 85 cm in the axial direction, depending upon the sensor length. The cable is, to the greatest possible extent, flexible and can be up to 100 m long.

The aforementioned rigid and axial arrangement of the cable and connection element results in problematic measuring configurations under certain operating conditions, e.g., in the laboratory in the beaker. It can thus happen that the dead weight of the sensor-cable arrangement makes a beaker tip over. Precautions must therefore be taken in order to prevent this possible situation effectively; see FIG. 1.

Figure 1:
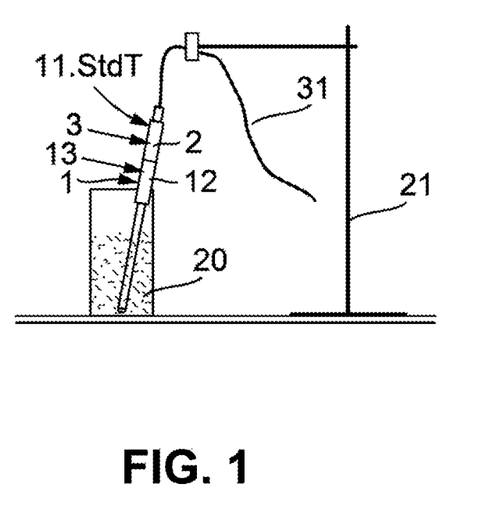
FIG. 1 shows a conventional sensor with a connection element.

FIG. 1 shows a sensor 1 with a connection element 11.StdT, as well as a cable 31. The sensor 1 is located in a beaker with the medium 20 to be measured. On the sensor 1 and on the connection element 11. StdT are respectively located coupling bodies 2 and/or 12, as well as the interfaces 3 and/or 13. The connection element 11. StdT is held by a holder 21 such that the sensor 1 cannot tip over. An additional holder 21 is cumbersome and expensive. The uncoupling of the sensor 1 from the connection element 11.StdT is, furthermore, made more difficult, or, depending upon the arrangement of the holder, the coupling elements 2 and 12 are hard to access or not accessible at all. The cable 31, connection element 11. StdT, and sensor 1 are rigidly connected to one another, so that it must always be kept in mind during the installation that the sensor 1 is aligned appropriately and the cable 31 can be positioned accordingly.

SUMMARY

The present disclosure is based upon the aim of overcoming the disadvantages of the prior art. To be proposed is, in particular, a sensor-cable combination that is flexible to handle and can be used in many fields of application.

The aim is achieved by a sensor arrangement comprising: a sensor comprising at least one sensor element for detecting a measurand of process automation, a first interface for transmitting a value that is a function of the measurand to a second interface, and a first coupling body comprising the first interface; and a connection element for transmitting the value that is a function of the measurand to a higher-level unit, comprising a first housing section with a second interface complementary to the first interface, wherein the first and second interfaces are designed for the bi-directional communication between the sensor and the higher-level unit, wherein the first and second interfaces also ensure the power supply to the sensor, in addition to the communication, a second housing section with a second coupling body, which is complementary to the first coupling body and which can be brought into an open and a locked condition, wherein, in the open condition, the connection element can be connected to the sensor via the first and second coupling bodies and disconnected again, and wherein, in the locked condition, a connection or disconnection of the connection element from the sensor is prevented. In the sensor arrangement of the present disclosure, the first housing section can be rotated in relation to the second housing section.

In doing so, the energy transfer and communication between the connection element and the sensor is not affected. The sensor-cable combination is thus more flexible and can be used in more fields of application.

In one embodiment, the first housing section can also be rotated in relation to the second housing section in the locked condition of the second coupling body.

In one embodiment, the first housing section can also be rotated in relation to the second housing section when the connection element is connected to the sensor. Such an embodiment is particularly interesting for a user because a measurement is generally only performed when the connection element is connected. A rotation is thus also possible during a measurement.

In one embodiment, the first coupling body comprises first locking means of a bayonet joint, and the second coupling body comprises second locking means of a bayonet joint. A bayonet joint is a quickly established and disconnected mechanical connection of two substantially cylindrical parts.

The aim is furthermore achieved by a connection element comprising: a first housing section with an interface for transmitting the value that is a function of the measurand to the higher-level unit, wherein the interface is designed for the bi-directional communication between the sensor and the higher-level unit, wherein the interface also ensures the power supply to the sensor, in addition to the communication; a second housing section with a coupling body that can be brought into an open and a locked condition, wherein, in the open condition, the connection element can be connected to the sensor via the coupling body and disconnected again, wherein, in the locked condition, a connection or disconnection of the connection element from the sensor is prevented. The connection element is characterized in that the first housing section can be rotated in relation to the second housing section.

In one embodiment, the coupling body comprises locking means for forming a bayonet joint.

In one embodiment, the coupling body comprises a base body and a locking means carrier, to which the locking means are attached, wherein the locking means carrier can be rotated in relation to the base body. The rotary motion for opening and locking the bayonet joint is thus separated from the cable attachment and the cable. In other words, the cable does not rotate as well when the bayonet joint is opened or locked.

In one embodiment, the base body comprises at least one protrusion, wherein, by introducing the protrusion and the locking means into a corresponding recess in particular, in the sensor and by a subsequent rotation of the locking means carrier in relation to the base body, the bayonet joint, and thus the coupling body, is locked.

In one embodiment, the locking means are designed to be integral with the coupling body. The term, "integral," in this context is to be understood to mean that the locking means form one unit with the associated coupling body, so that no relative movement of the locking means in relation to the respective coupling body is possible, except for possibly occurring, minimal elastic deformations. To this end, the locking means can respectively be produced as a monolithic part, such as a cast part, with the associated coupling body, be carved out of the coupling body as a recess, or be produced separately and subsequently mounted on the coupling body in a sufficiently stiff manner.

In one embodiment, the first housing section is mounted on the second housing section by means of a snap ring, O-ring, or splint.

A snap ring is a particular form of retaining ring and serves to axially affix the first housing section to the second housing section in a form-fitted manner. The snap ring itself consists, for example, of a somewhat circularly bent spring steel or spring steel wire with constant cross-section, which spring steel or spring steel wire is bent to form a ring. The ends are not flush with one another and therefore produce, during the radial tightening motion, an axial force effect that is to prevent an automatic disconnection as a result of, for example, vibrations. In one embodiment, washers are additionally used, for better locking.

In one embodiment, the first housing section and the second housing section are designed to be nestable, wherein one of the housing sections comprises a groove and the other housing section comprises a projection complementary to the groove, wherein the projection can be engaged with the groove in order to assemble the housing sections. This is another option for connecting the two housing sections to one another. This variant is easy to produce.

Alternative embodiments with respect to the groove mentioned include an indentation, cut, notch, recess, undercut, or the like.

In one embodiment, the housing sections are designed to not be disconnectable from each other after the first is connected to the second for the first time. Even though it is necessary for the assembly that the first and second housing sections can be easily nested, it is not necessary, and even troublesome, for the user for them to be disconnectable from one another again.

Additional seals between the housing sections are not necessary, since this region is not in contact with the medium. Since the power supply and the data transmission takes place via the interface, even entering medium is not disruptive.

In one embodiment, the first housing section comprises a first region with the interface and a second region, wherein the first region is arranged in relation to the second region such that their respective longitudinal axes form a first angle greater than 0°.

The axial arrangement of the existing sensor-cable combination is thus abandoned. This results in various advantages. For example, in the setup with the beaker mentioned at the beginning, the structural stability of laboratory setups is increased, because the moment of tilt is drastically reduced. Additional structures for increasing the steadfastness of the sensor are avoided.

This also results in a space-saving setup overall. Additional fields of application furthermore arise, since the respective couplings are easier to access.

In one embodiment, the second region comprises a cable attachment, wherein the cable attachment makes it possible to connect the connection element to the higher-level unit, wherein the cable attachment is arranged in relation to the second region such that their longitudinal axes form a second angle greater than 0°. This further increases the flexibility and application possibilities of the connection element.

In one embodiment, the first and/or second angle is 45° or 90°. These angles are both easy to produce and practical to use for the user. 180° for the first angle is also a reasonable size for the user.

In one embodiment, the connection element comprises a nib. This nib is, in this case, arranged in the second region or in the third region. The nib is located, in one embodiment, on the underside, i.e., on the same side in the axial direction in relation to the longitudinal axis as the second interface. The nib ensures that the connection element can be mounted or is supported on the edge of a container. The cable-sensor arrangement stands more steadily and is more robust with respect to falling over and tipping.

In one embodiment, the interface is designed to be an inductive interface.

In one embodiment, the connection element comprises an articulated joint, wherein the articulated joint further divides the second region of the first housing section, viz., into a second and a third subregion, wherein the third subregion comprises a cable attachment, wherein the cable attachment makes it possible to connect the connection element to the higher-level unit, and wherein the articulated joint can be rotated. This further increases the flexibility of the connection element. Additional movability is provided.

Additionally or alternatively, the articulated joint in one embodiment separates the first region from the second region. In one embodiment, the connection element comprises two articulated joints, viz., between the first region and the second subregion, as well as between the second and third subregions.

In a first variant, the articulated joint is a joint with a degree of freedom in particular, a rotary joint and the articulated joint can be rotated by an angle of rotation of −180° to +180°.

In one embodiment, the articulated joint is designed for setting the angle of rotation on the articulated joint in steps, and the articulated joint comprises a locking device in particular, with detents wherein the locking device fixes the neighboring regions in relation to one another in the angle of rotation. The articulated joint can thus be adjusted in steps, wherein the steps can be fixed. The user can thus permanently set the desired angle.

Alternatively, the articulated joint is designed for steplessly setting the angle of rotation on the articulated joint.

So that the angle of rotation can also be fixed in case of a stepless setting of the angle of rotation, the articulated joint comprises a braking device, wherein the braking device is designed to maintain the set angle of rotation, wherein the braking device forms a force fit between the respective neighboring regions.

In a second variant, the articulated joint is a joint with three degrees of freedom in particular, a ball joint.

In one embodiment, the sensor is a pH sensor also as ISFET, generally an ion-selective sensor a sensor for the measurement of the redox potential, of the absorption of electromagnetic waves in the medium, e.g., with wavelengths in the UV, IR, and/or visible range, of the oxygen, of the conductivity, of the turbidity, of the concentration of non-metallic materials, or of the temperature.

In one embodiment, the higher-level unit is a transmitter or a control center, wherein the connection element comprises an intelligent unit in particular, a microcontroller and the intelligent unit converts the value that is a function of the measurand into a protocol that can be understood by the transmitter or the control center. In one embodiment, the sensor also or alternatively comprises an intelligent unit that takes over the described tasks.

In one embodiment, the intelligent unit comprises switching means for detecting, processing, and forwarding values that are functions of the measurand to the higher-level unit. The switching means comprise, for example, an analog sensor electronic component, an analog-to-digital converter for converting the detected analog values into digital values, a computing unit, and a communication unit for processing and forwarding the digital measured values to the higher-level unit, such as a transmitter or a control center, according to a protocol that can be understood by the higher-level unit, such as a standard communication protocol of process automation technology.

In one embodiment, the higher-level unit is a control center, and the protocol that can be understood by the control center includes HART, wirelessHart, Modbus, Profibus Fieldbus, WLAN, Zigbee, Bluetooth, or RFID.

BRIEF DESCRIPTION OF THE DRAWINGS

The present disclosure is explained in more detail with reference to the following figures. These show.

In the figures, the same features are marked with the same reference characters.

DETAILED DESCRIPTION

Figure 2A:
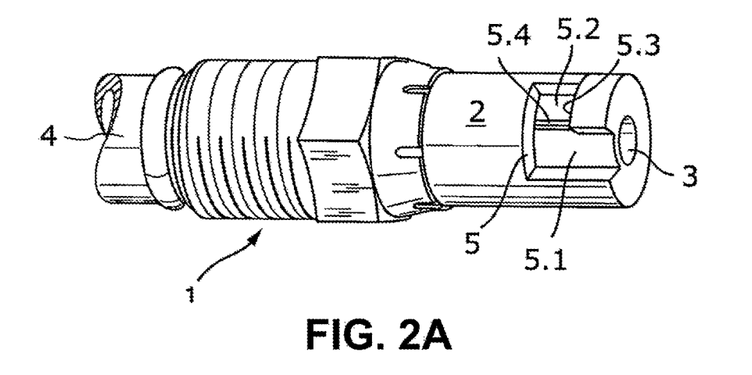
FIGS. 2A-2C show the claimed sensor arrangement with sensor (FIG. 2A) and connection element in the open (FIG. 2B) and locked (FIG. 2C) conditions.
Figure 2B:
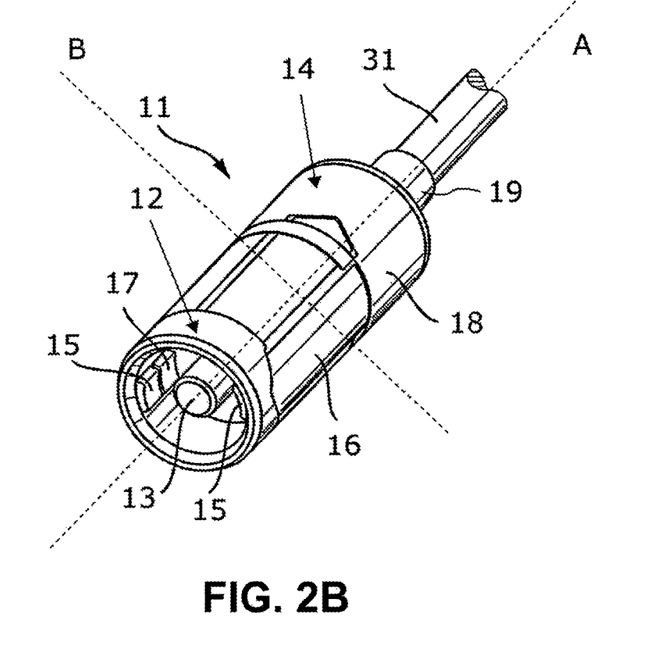
Figure 2C:
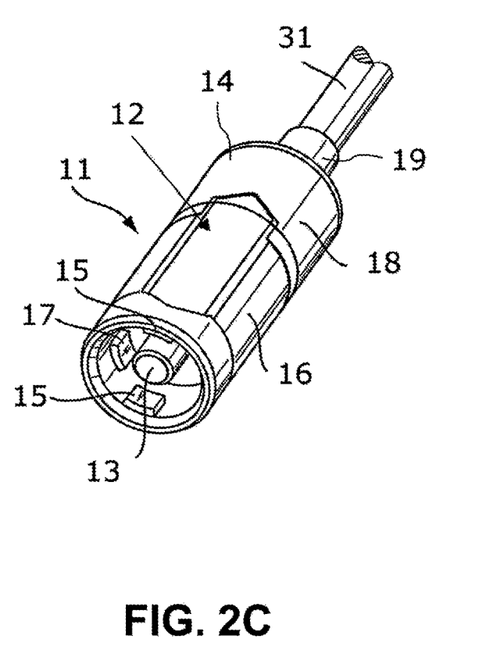

A claimed sensor arrangement 10 comprises a sensor 1 (see FIG. 2A) and a connection element 11 (see FIG. 2B). FIGS. 2A-2C show the sensor 1 or the connection element 11 with an angle α=0°; see, in this regard, FIG. 4, as well as the associated description below.

The sensor 1 in turn comprises at least one sensor element 4 (only indicated in FIG. 2A) for detecting a measurand of process automation. The sensor 1 is then, for example, a pH sensor also as ISFET, generally an ion-selective sensor a sensor for the measurement of the redox potential, of the absorption of electromagnetic waves in the medium, e.g., with wavelengths in the UV, IR, and/or visible range, of oxygen, of conductivity, of turbidity, of the concentration of non-metallic materials, or of the temperature, with the respectively appropriate measurand.

The sensor 1 further comprises a first coupling body 2, which comprises a first interface 3. The first interface 3 is designed for the transmission of a value that is a function of the measurand to a second interface 13, shown in FIG. 2B. The interfaces 3, 13 are designed as inductive interfaces. Alternatively, an optical interface, for example, can be used. The sensor 1 may comprise a data processing unit, such as a microcontroller (not shown), which processes the values of the measurand for example, by converting them into a different format. In this way, an averaging, pre-processing, and digital conversion can be carried out by the data processing unit.

The sensor 1 can be connected via the interfaces 3, 13 to the connection element 11, and ultimately to a higher-level unit (not shown). The higher-level unit is, for example, a transmitter or a control center. The data processing unit converts the value that is a function of the measurand into a protocol that can be understood by the transmitter or the control center. Examples in this regard include, for example, the proprietary Memosens protocol or HART, wirelessHART, Modbus, Profibus Fieldbus, WLAN, ZigBee, Bluetooth, or RFID. This conversion can also be carried out in a separate communications unit instead of in the data processing unit, wherein the communication unit is arranged on the side of the sensor 1 or the connection element 11. The aforementioned protocols also include wireless protocols, such that a corresponding communications unit comprises a wireless module. The first and second interfaces 3, 13 are thus designed for the bi-directional communication between the sensor 1 and the higher-level unit. In addition to the communication, the first and second interfaces 3, 13 also ensure the supply of power to the sensor 1.

The connection element 11 comprises the second interface 13, wherein the second interface 13 is designed to be complementary to the first interface 3. The connection element 11 further comprises a second, cylindrical coupling body 12 that is designed to be complementary to the first coupling body 2 and can be slipped with a sleeve-shaped end section onto the first coupling body 2, wherein the second interface 13 is inserted into the first interface 3. In the sleeve-shaped end section of the second coupling body 12, locking means 15 extend radially inward in order to engage with angled recesses 5 on the shell surface of the first coupling body 2 and form a bayonet joint. The angled recesses 5 comprise an open axial section 5.1 open to the end face of the coupling body 2 and an angled azimuthal section 5.2 spaced apart from the end face. The azimuthal section 5.2 comprises an axial stop surface 5.3, which faces the end face of the coupling body 2 and prevents the disconnection of the sensor 1 from the connection element 11 when the bayonet joint is locked. The axial stop surface 5.3 preferably comprises an azimuth-dependent axial contour, which causes the second coupling body 12, and thus the connection element 11, to be drawn more strongly to the first coupling body 2, and thus the sensor 1, when the bayonet joint is closed. In the recesses 5 are additionally arranged axial ribs 5.4, on which the radially inward directed shell surfaces of the radially inward extending locking means 15 sit with their angle-dependent contour. This ultimately brings about a locking against rotation as a result of a slightly elastic deformation of the sleeve-shaped end section.

The locking means 15 are designed to be integral with the second coupling body 12, e.g., as an injection-molded part.

The connection element 11 comprises an at least section-wise cylindrical base body 18, onto which a sleeve-like locking means carrier 16 is slipped, wherein the locking means carrier 16 is fixed axially in relation to the base body 18 and is freely movable in the azimuthal direction at least across an angular range that is required for closing and opening the bayonet joint.

From the section of the base body 18 facing away from the cable attachment 19 extend axial protrusions 17, which respectively engage with an axial section 5.1 of the complementary recesses 5 on the first coupling element 2 when the connection element 11 is connected to the sensor 1.

The sleeve-like locking means carrier 16 projects beyond the axial protrusions 17 in the axial direction. From the inner wall of the locking means carrier 16 extend protrusions 15 radially inward, wherein the protrusions serve as second locking means 15 for the bayonet joint. The protrusions 15 are distributed over the circumference of the inner wall such that they are flush with the axial protrusions 17 when the azimuth angle between the locking means carrier 16 and the base body 18 is appropriately set with respect to their azimuth position, as shown in FIG. 2B. In this position, the second coupling body 12 can be slipped onto the first coupling body 2, wherein the radial protrusions 17 are arranged in the transition region between the axial section 5.1 and the azimuthal section 5.2 of the recesses 5 when the connection element 11 is slipped onto the sensor 1. By rotating the azimuth angle between the base body 18 and the locking means carrier 16, the radial protrusions 17 are brought into the azimuthal section 5.2 of the recesses 5, whereby the bayonet joint is locked as shown in FIG. 2C.

The second coupling body 12 and the second interface 13 are arranged at least in sections in a housing 14 of the connection element 11. The housing 14 typically has a rectangular cross-section, i.e., the housing 14 has a longitudinal axis A and a transverse axis B. Naturally, a square cross-section is also possible; the longitudinal axis A then refers to the axis in the direction of a cable attachment 19. The transverse axis B extends orthogonally to the longitudinal axis A. Cable attachment 19 in this respect refers to the region of the housing 14 with which the cable 31 engages.

Figure 3A:
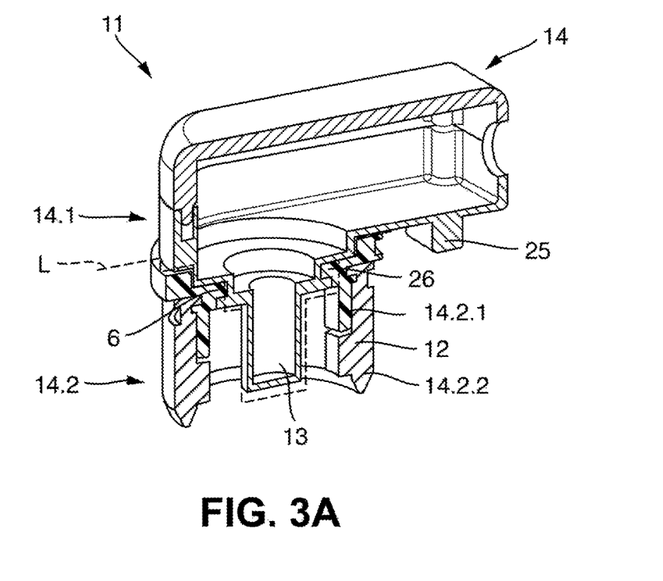
FIGS. 3A and 3B show the connection element from FIG. 2B in cross-section (FIG. 3A) and in a top view of the rear side (FIG. 3B)
Figure 3B:
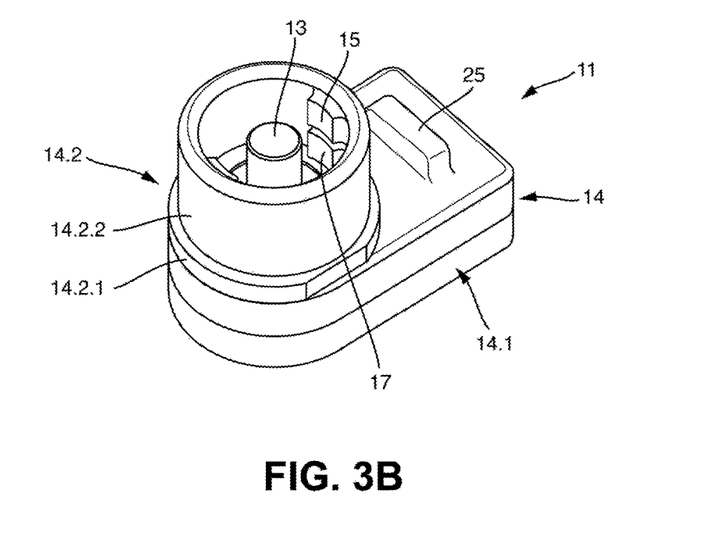

FIG. 3A and FIG. 3B show the connection element 11 in more detail. The housing 14 of the connection element 11 comprises a first housing section 14.1 with the second interface 13 and a second housing section 14.2 with the second coupling body 12. In the cross-section shown in FIG. 3A, the dashed line L indicates an imaginary separating line between the first and second housing sections 14.1 and 14.2. In the embodiment shown in FIGS. 3A and 3B, the interface 3 is arranged at an angle α=90° in relation to the longitudinal axis A. This angular arrangement is also shown in FIG. 4B and is explained in more detail at the appropriate passage in the description further below.

The first housing section 14.1 can be rotated in relation to the second housing section 14.2. In doing so, the energy transfer and communication between the connection element 11 and the sensor 1 is not affected.

The second housing section 14.2 can be brought into an open condition and a locked condition, wherein, in the open condition, the connection element 11 can be connected to the sensor 1 via the first and second coupling bodies 2, 12 and disconnected again, and wherein, in the locked condition, a connection or disconnection of the connection element 11 from the sensor 1 is prevented.

The first housing section 14.1 can be rotated in relation to the second housing section 14.2, both in the open and in the locked conditions. In particular, the first housing section 14.1 can be rotated in relation to the second housing section 14.2 in both the open and the locked conditions when the sensor 1 is connected to the connection element 11.

In a first embodiment (not shown), the first housing section 14.1 is mounted to the second housing section 14.2 by means of a snap ring, O-ring, or splint. To this end, the second housing section 14.2 is brought onto and over the first housing section 14.1 and secured as described above. The second housing section 14.2 comprises for this purpose both locking means 15 and protrusions 17. The locking means 15 and the protrusions 17 are designed to be rotatable in relation to one another, so that the bayonet joint can be closed in order to secure the connection element 11 on the sensor 1, and the connection element 11 is retained securely on the sensor 1. However, it is further ensured that the first and second housing sections 14.1, 14.2 can be rotated in relation to one another.

In a second embodiment shown in FIGS. 3A and 3B, the first housing section 14.1 and the second housing section 14.2 are designed to be nestable. To this end, the first housing section 14.1 comprises a groove 6. The second housing section 14.2 comprises a projection 26 designed to be complementary to the groove 6. By assembling the housing sections 14.1, 14.2, the projection 26 engages with the groove 6.

In principle, but not shown in the figures, a reverse arrangement is also possible, i.e., the second housing section 14.2 comprises the groove 6, and the first housing section 14.1 comprises the projection 26.

As an alternative to the groove 6, an indentation, recess, cut, notch, or undercut or the like can, for example, also be used.

The housing sections 14.1, 14.2 cannot be disconnected from each other after the first section is connected to the second section for the first time for example, during the assembly at the manufacturer.

The second housing section 14.2 of the connection element 11 consists, in FIGS. 3A and 3B, of two parts 14.2.1 and 14.2.2. The first part 14.2.1 comprises the aforementioned projection 26. In addition, this first part 14.2.1 comprises the protrusion 17. The second part 14.2.2 comprises the locking means 15. By moving the first part in relation to the second part 14.2.1, 14.2.2, the bayonet joint is closed, and the connection element 11 is thus locked with the sensor 1. In any condition, the first housing section 14.1, however, remains rotatable in relation to the second housing section 14.2, which is possible, as mentioned, as a result of the mounting with the groove 6 and the projection 26. Advantages result, in particular, in the interaction with an angled arrangement in particular, of 90° of the interface 13 to the first housing section (as to the cable attachment 16, see below), which advantages will be discussed below with reference to FIG. 4A-C.

Figure 4A:
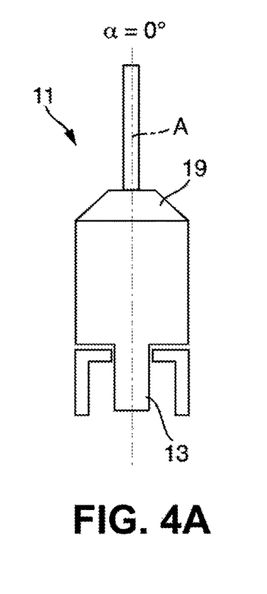
FIGS. 4A-4C show the connection element with various angles between the first and second housing sections.
Figure 4B:
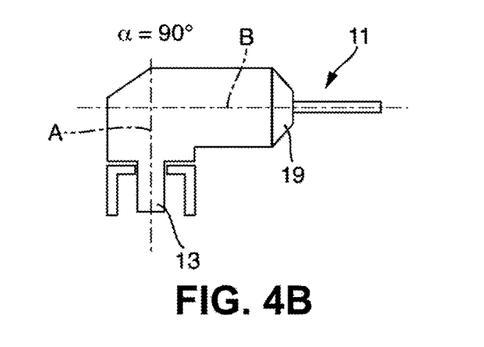
Figure 4C:
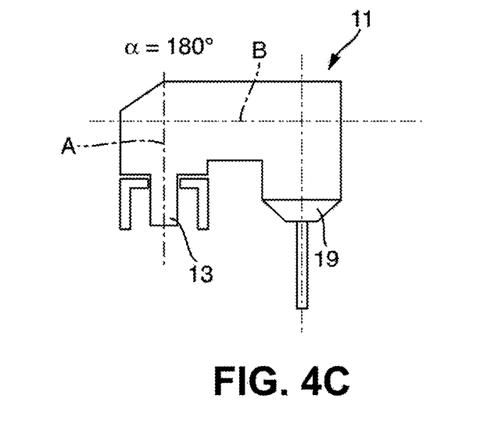

FIG. 4A shows the arrangement as shown in FIGS. 2A-2C. FIG. 4B shows the arrangement as shown in FIGS. 3A and 3B and FIGS. 5A-5D, and FIG. 6. FIG. 4C shows another arrangement.

The first housing section 14.1 of the connection element 11 comprises a nib 25; see, in this regard, FIGS. 3A and 3B. The nib 25 is, in this case, arranged in the second region 14.1.2; see below. In the embodiment with an articulated joint 23 (see also below), the nib 25 is arranged either in the region with the reference symbol 14.1.2' or in the third region 14.1.3. The nib 25 is located on the underside, i.e., on the same side in the axial direction in relation to the longitudinal axis A as the interface 13. The nib 25 ensures that the connection element 11 can be mounted or is supported on the edge of a beaker, basin, or the like (i.e., the "container" of the medium to be measured). The cable-sensor arrangement stands more steadily and is more robust with respect to falling over and tipping.

FIGS. 4A-4C show various possibilities with respect to the angle of the arrangement of the interface 13 in relation to the cable attachment 19. In this case, the angle with the reference symbol $\alpha$ is not to be seen in a strictly mathematical sense (the angle is part of the plane delimited by two half-lines lying in the plane and having a common starting point), but as the alignment of the interface 13 in relation to the cable attachment 19.

FIG. 4A shows $\alpha=0°$, i.e., the interface 13 and the cable attachment 19 are in a linear arrangement. FIG. 4B and FIG. 4C show the angle $\alpha=90°$ and $\alpha=180°$, respectively, i.e., the interface 13 and the cable attachment 19 are arranged in relation to one another at this same angle. In the arrangement with $\alpha=90°$, the cable attachment 19 is arranged in the direction of the transverse axis B.

Figures 5A, 5B, 5C:
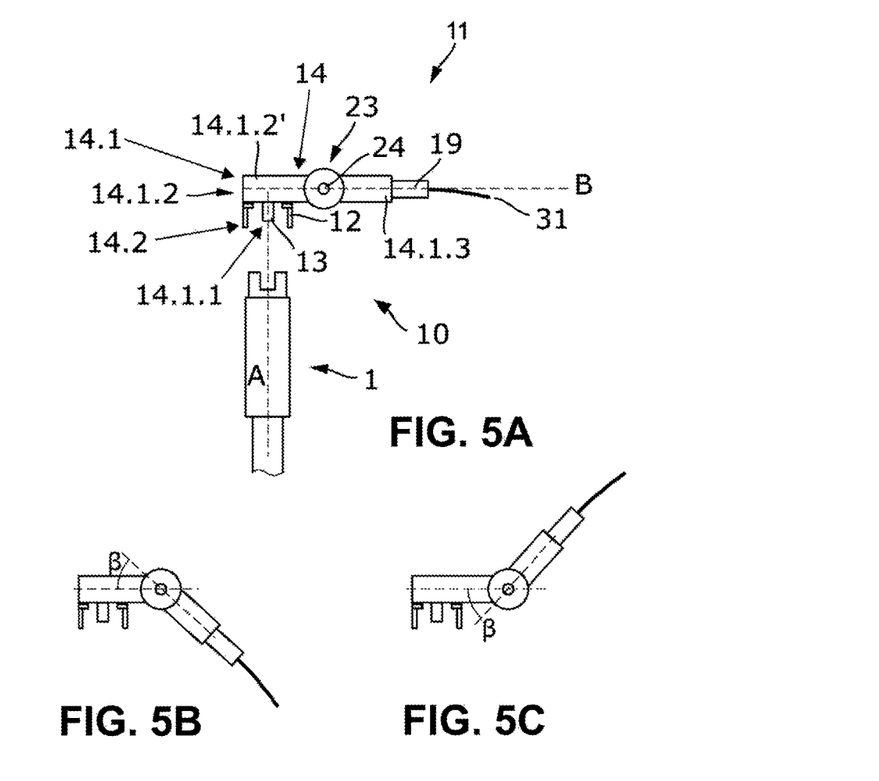
FIGS. 5A-5D show a claimed sensor arrangement with angles of 0° (FIG. 5A), +45° (FIG. 5B), and −45° (FIG. 5C) of an articulated joint in a first embodiment and a second embodiment (FIG. 5D)

FIGS. 5A-5D shall now be discussed. As mentioned, the connection element 11 comprises a housing 14 with a first housing section 14.1 comprising the interface 13, and a second housing section comprising the second coupling body 12. The first housing section 14.1 comprises a first region 14.1.1 with the interface 13 and a second region 14.1.2. In FIG. 5A, the first region 14.1.1 and the second region 14.1.2 are arranged in relation to one another at an angle $\alpha=90°$; this thus corresponds to the illustration in FIG. 4B. The description regarding FIG. 5A can, however, also be transferred to any other angle $\alpha$, such as 0° (see FIG. 4A) or, for example, 45°.

FIGS. 5A-5D show the connection element 11, which further comprises an articulated joint 23. The articulated joint 23 further divides the second region 14.1.2 of the first housing section 14.1. In the illustration in FIGS. 5A-5D, the subregion on the left side of the articulated joint 23 shall be denoted by reference symbol 14.1.2', and the subregion on the right side of the articulated joint 23 shall be denoted by reference symbol 14.1.3. This subregion 14.1.3 comprises the cable attachment 19. The articulated joint 23 enables a further flexibility with respect to the handling of the connection element 11 results.

In one embodiment, the articulated joint 23 can likewise separate the first region 14.1.1 from the second region 14.1.2. The descriptions regarding FIGS. 5A-5D apply analogously to this embodiment. It is, furthermore, possible to use two articulated joints a first one for the separation between the regions 14.1.1 and 14.1.2' and a second one for the separation between the regions 14.1.2' and 14.1.3. The descriptions regarding FIGS. 5A-5D also apply to this embodiment. In the following, these regions shall be called first region 14.1.1, second region 14.1.2', and third region 14.1.3.

By means of the articulated joint 23, the second region 14.1.2' can be rotated in relation to the third region 14.1.3 by an angle $\beta$.

In a first embodiment of the articulated joint 23, the articulated joint is a joint with one degree of freedom, for example, a rotary joint. An alternative embodiment is a hinge joint. The articulated joint 23 can thus be rotated by an angle of rotation $\beta$ of $-180°$ to $+180°$; shown in FIGS. 5A-5C are the angles 0°, +45°, and −45°.

In this first embodiment of the articulated joint, the joint 23 comprises a pin 24, which engages in the respective eyes in the second and third regions 14.1.2', 14.1.3. Generally, one of the two sides (i.e., either the second or the third region 14.1.2'/14.1.3) comprises one eye, while the respective other side comprises two eyes, which are then arranged one above the other with the individual eye in the middle. Either the pin 24 is designed as a screw, wherein this screw is secured by an appropriate nut (not shown), or the pin 24 is secured by a material bond, such as by rivets, welding, etc.

The articulated joint 23 can also be arranged at any other angle in relation to the longitudinal axis A, e.g., 90° in relation to the illustration shown in FIGS. 5A-5C. Another solid angle, e.g., out of the drawing plane, is also possible. In FIGS. 5A-5C, the pin 24 is orthogonal to the second coupling element 12; a parallel arrangement is an alternative.

The angle $\beta$ can be set steplessly or in steps. When setting the articulated joint 23 in steps, a locking device (not shown) is provided on the articulated joint 23, which locking device is designed to permanently set the angle $\beta$ on the articulated joint 23 in steps. The locking device is, for example, designed as a locking device with detents.

In case of the stepless setting of the angle, the articulated joint 23 comprises a braking device (not shown), so that the set angle $\beta$ is maintained. The braking device forms a force fit between the second region 14.1.2' and the third region 14.1.3. This can take place most easily by pressure, since, in the case of this force-fitted connection, the two parts, i.e., the second region 14.1.2' and the third region 14.1.3, exert a normal force on each other. Their relative movement is prevented as long as the opposing force caused by the static friction (i.e., for example, the rotating by hand) is not exceeded. Alternatively, but still included in the force fit, a screw can be used, wherein a rotation by the angle $\beta$ is prevented in the screwed condition.

Figure 5D:
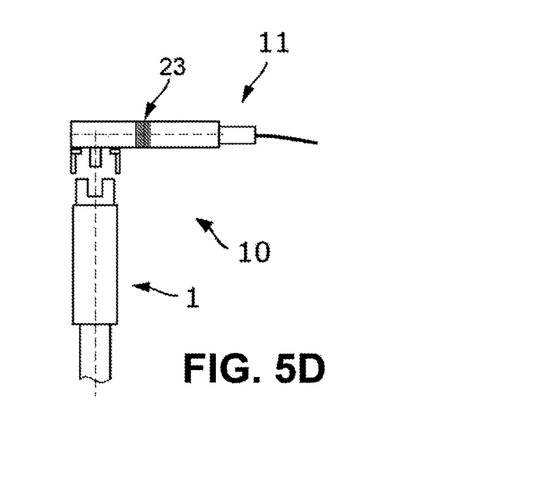

In a second embodiment in FIG. 5D, the joint 23 is made from individual rigid members that are, however, connected to one another.

In a further embodiment, the articulated joint 23 is a joint with three degrees of freedom for example a ball joint (not shown). Thus, the third region 14.1.3 can be rotated in relation to the second region 14.1.2' by even more angles, i.e., for example, additionally out of the drawing plane.

Figure 6:
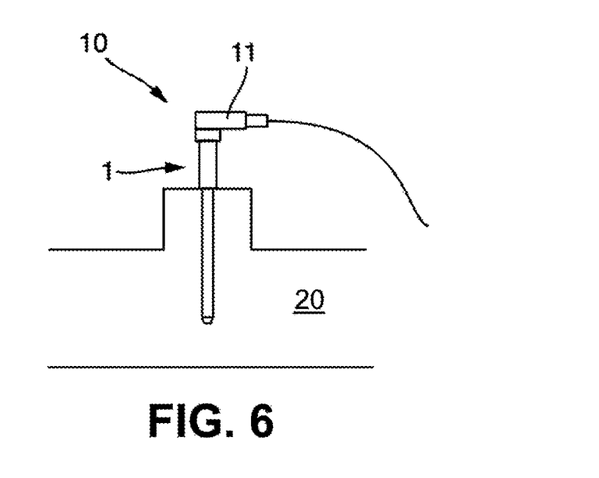
FIG. 6 shows an application example of a sensor arrangement according to the present disclosure.

FIG. 6 shows an application example of the sensor arrangement 10 according to the present disclosure in a duct with a medium 20 to be measured. In this case, the connection element 11 is at an angle in relation to the sensor 1. An additional holder is not necessary, since the moment of tilt of the structure is significantly reduced compared to the prior art.

The invention claimed is:

1. A sensor arrangement for use in process automation, comprising:

a sensor including:
  at least one sensor element for the detection of a property of a medium to be measured of the process automation;
  a first interface for transmitting a value that is a function of the property of a medium to be measured to a second interface; and
  a first coupling body including the first interface; and a connection element releasably connected with the sensor element via a second interface and
the first interface for transmitting the value that is a function of the property of a medium to be measured to a higher-level unit, including:
  a first housing section including the second interface to mating with the first interface, wherein the first interface and second interface are configured for bi-directional communication between the sensor and the higher-level unit, and wherein the first interface and second interface enable a power supply to the sensor; and
  a second housing section with a second coupling body that is to mating with the first coupling body and having an open position and a locked position, wherein in the open position the connection element can be connected and disconnected to the sensor via the first coupling body and the second coupling body, and wherein in the locked position a connection or
disconnection of the connection element from the sensor is prevented, wherein the first housing section can be rotated in relation to the second housing section.

2. The sensor arrangement of claim 1, wherein the first housing section can be rotated in relation to the second housing section in the locked position of the second coupling body.

3. The sensor arrangement of claim 1, wherein the first housing section can be rotated in relation to the second housing section when the connection element is connected to the sensor.

4. The sensor arrangement of claim 1, wherein the first coupling body includes a first locking means of a bayonet joint, and the second coupling body includes a second locking means of a bayonet joint.

5. A connection element for use in process automation for transmitting a value that is a function of a property of a medium to be measured from a sensor via a sensor element having a first interface to a higher-level unit, comprising:
  a first housing section with an second interface for transmitting the value that is a function of the property of a medium to be measured to the higher-level unit, wherein the second interface is designed for bi-directional communication between the sensor and the higher-level unit, and wherein the second interface enables a power supply to the sensor; and
  a second housing section with a coupling body embodied with an open position and a locked position, wherein in the open position the connection element is reversibly connected to the sensor via the coupling body, and
  wherein in the locked position a connection or a disconnection of the connection element to/from the sensor is prevented;
  wherein the first housing section can be rotated in relation to the second housing section;
  wherein the connection element is releasably connected to the sensor element via the second interface and the first interface.

6. The connection element of claim 5, wherein the locking means are configured to be integral with the coupling body.

7. The connection element of claim 5, wherein the first housing section is mounted to the second housing section by means of a snap ring, O-ring, or splint.

8. The connection element of claim 5, wherein the first housing section and the second housing section are embodied to be nestable, wherein either the first housing section or the second housing section includes a groove, and the other housing section includes a projection complementary tomating with the groove, wherein the projection engages the groove to assemble the housing sections.

9. The connection element of claim 8, wherein the first housing section and the second housing section are embodied to not be disconnectable from each other once the first housing section is connected to the second housing section.

10. The connection element of claim 5, wherein the coupling body includes a locking means for forming a bayonet joint.

11. The connection element of claim 10, wherein the coupling body includes a base body and a locking means carrier, to which the locking means are attached, wherein the locking means carrier can be rotated in relation to the base body.

12. The connection element of claim 11, wherein the base body includes at least one protrusion, wherein by introducing the protrusion and the locking means into a corresponding recess in the sensor and by a subsequent rotation of the locking means carrier in relation to the base body, the bayonet joint, and thereby the coupling body, is locked.

13. The connection element of claim 5, wherein the first housing section includes a first region having the interface and a second region, wherein the first region is arranged in relation to the second region such that respective longitudinal axes of the first region and second region form a first angle greater than 0°.

14. The connection element of claim 13, wherein the first angle and/or the second angle is 45° or 90°.

15. The connection element of claim 13, wherein the second region includes a cable attachment that enables the connection element to be connected to the higher-level unit, wherein the cable attachment is arranged in relation to the second region such that longitudinal axes of the cable attachment and the second region form a second angle greater than 0°.

16. The connection element of claim 15, wherein the connection element is connected to the higher-level unit via a cable.

* * * * *